June 13, 1939.                W. S. PATTERSON                2,162,272
                        COFFEE BAG, TEA BAG, AND THE LIKE
                              Filed Dec. 8, 1937

Inventor.
William S. Patterson
by Heard Smith & Tennant.
                Attys.

Patented June 13, 1939

2,162,272

UNITED STATES PATENT OFFICE 2,162,272

COFFEE BAG, TEA BAG, AND THE LIKE

William S. Patterson, Arlington, Mass.

Application December 8, 1937, Serial No. 178,767

4 Claims. (Cl. 99—77.1)

This invention relates to coffee bags and the like such as are used in making individual cups of coffee or other infusion. It consists of the combination of a sealed container within a porous container. The purpose of the sealed container is to protect the quality of the ingredients therein till use is desired. The purpose of the porous container is to strain the grounds from the liquid after the brewing has been completed.

A novel feature of the invention is that the sealed container may be unsealed or broken without disrupting the outer porous container. This bag for individual servings may be used for coffee or tea or any similar ingredients requiring brewing, protection from deterioration and straining of grounds. It is most adaptable to coffee as coffee requires to be pulverized for quick brewing, and pulverized coffee must have sealed protection from the air to retain its goodness.

For making a satisfactory cup of coffee it is essential that the aroma and volatile flavoring of the coffee ingredients be retained therein up to the time that the coffee infusion is made. In the ordinary coffee bag now used for making an individual cup of coffee, the ground coffee is contained directly in a bag made of fabric. This type of coffee bag is open to the objection that the fabric bag does not provide a proper seal for the ground coffee, and as a result much of the aroma as well as some of the ingredients essential to the making of a satisfactory cup of coffee are lost by evaporation between the time that the bag is made and the time that it is used by the customer in making a cup of coffee.

The invention above described has for its object to overcome the above disadvantages of the ordinary coffee bag.

The bag may be made in various sizes without departing from the invention, that is, it can be made of a size suitable for use in producing a single cup of coffee or it may be made in a larger size suitable for making several cups of coffee.

In order to give an understanding of the invention I have illustrated in the drawing some selected embodiments thereof which will now be described after which the novel features will be pointed out in the appended claims.

In the drawing:

Fig. 5 is a view of a coffee bag of the pouch type embodying my invention.

Figure 1:
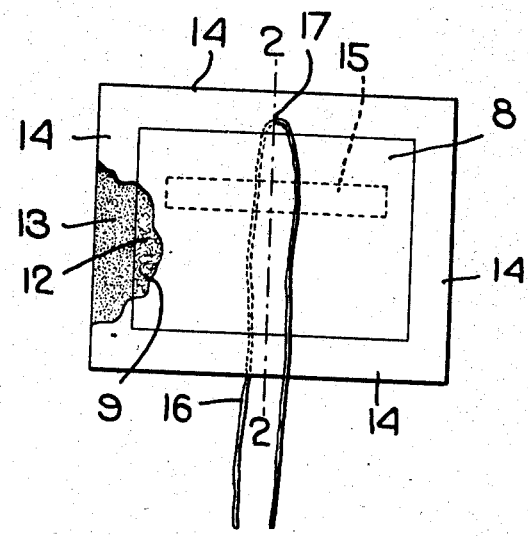
Fig. 1 is a view of one type of sealed container embodying my invention.
Figure 2:
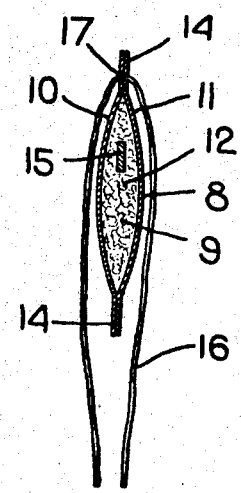
Fig. 2 is a section on the line 2—2, Fig. 1.
Figure 3:
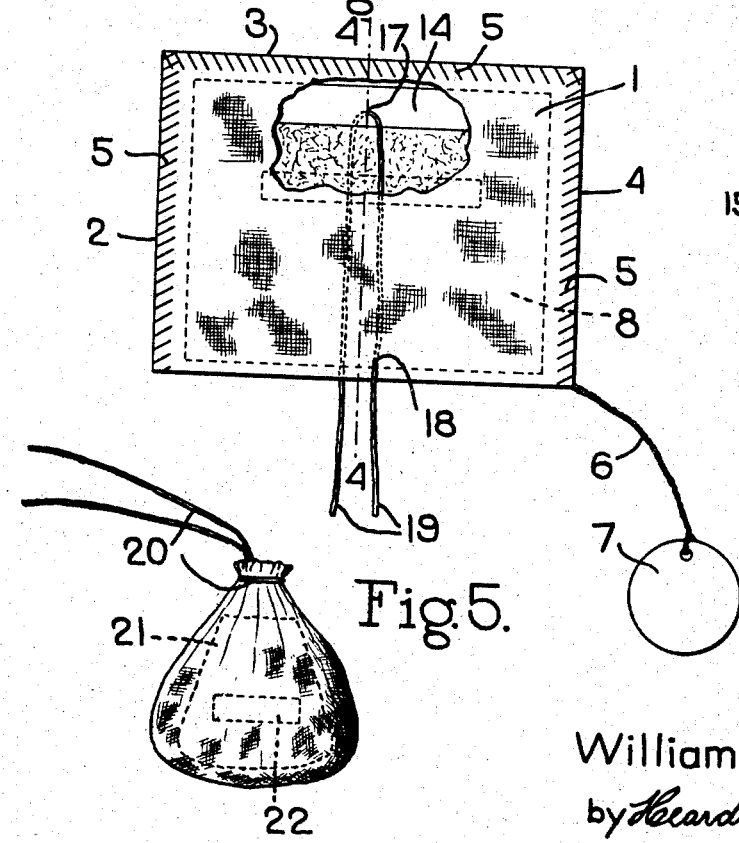
Fig. 3 is a view of a sewed coffee bag embodying my invention with parts broken out.
Figure 4:
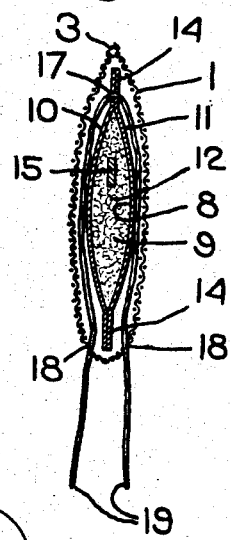
Fig. 4 is a section on the line 4—4, Fig. 3.

Referring to Figs. 3 and 4, 1 indicates a fabric bag of the "sewed bag" type such as is commonly used in the manufacture of coffee bags, tea bags and the like. This bag is formed by folding a blank of fabric or any other suitable porous material along its median line and then sewing the edges 2, 3 and 4 together by suitable stitching 5. In making these bags it is customary to extend one line of stitching beyond the bag as shown at 6 to form a cord-like element to which an identifying tag 7 is secured.

My invention involves the use within the bag 1 of a sealed container containing the charge of coffee or other essence-containing product and which can be readily opened while it is still within the bag 1 whenever it is desired to make a cup of infusion. In Figs. 1–4 such sealed container is indicated generally at 8 and it may be made in any suitable way without departing from my invention, an essential feature being that it should be so made as to provide a tight seal for the charge 9 of coffee, or the like. I find it convenient to make this sealed container 8 of some material like Cellophane although the invention is not limited to the use of Cellophane for this purpose. The container shown in the drawings is formed by welding or cementing together the marginal portions 14 of two superposed layers or plies 10 and 11, thereby leaving the central portion of the plies unattached to provide the chamber 12 adapted to receive the essence-containing material 9. In making the container a suitable cementitious substance indicated at 13 may be applied to the marginal portion of one of the plies and then the marginal portion of the other ply may be welded or cemented thereto by pressure. The sealed container 8 however can be made in any other way without departing from the invention, so long as it is constructed so that it can be readily opened while still within the bag 1. After the container 8 has been completed it is then inserted into the bag 1 and the latter is closed in the usual way.

When the bag is to be used for making a cup of coffee the container 8 is first opened while it is still enclosed within the bag 1, thereby to allow the hot water to have free access to the coffee material 9. The opening of the container 8 may be accomplished in any suitable way without departing from the invention. One way is to provide the container 8 with a puncturing element 15 which is located within said container and by which the walls of the container may be punctured by manipulating the bag in the fingers so as to bend the container sharply over one end of the puncturing element. For this purpose the puncturing element 15 may be a piece of metal or a small strip of some hard material such as wood.

Another way to provide for opening the container is to use a cementitious substance 13 for sealing the container which is soluble in water, especially hot water, so that when the coffee bag is submerged in hot water for the making of a cup of coffee the cement will be softened or dissolved sufficiently to open the bag.

As a further means for rupturing or opening the container I may employ the string element 16. This is shown as threaded through an opening 17 in one of the sealed edges of the container, and as extending along both sides of the container, and then through the bag 1 as indicated at 18 so that the ends 19 of the cord will be accessible outside the bag 1. By holding the bag in one hand and drawing on the cords 19 with the other the container 8 may be torn or ruptured so as to expose the coffee therein to the action of the hot water.

While I have suggested various ways in which the container may be ruptured, any one of which may be used, yet it will be understood that the invention is not limited to any particular way of opening the container while it is in the bag 1, an essential feature being that of having the coffee or other infusion-producing material sealed in a tight container which is within the fabric bag 1 and which can be readily opened when the cup of coffee or tea is to be made.

In Fig. 5 I have shown the invention as applied to a bag of the pouch type which is made by gathering together the edges of a square blank and then tying the gathered-together edges with a tie string 20. In this embodiment the sealed container containing the coffee or tea is indicated in dotted lines at 21 and the rupturing element is shown in dotted lines at 22.

I claim:

1. A coffee bag for making an individual cup of coffee, said bag comprising a bag member of fabric, an hermetically sealed container of impervious material situated within the bag member and containing the coffee grounds, and means associated with the container to rupture the latter while it is still confined within the bag member.

2. A coffee bag for making an individual cup of coffee, said bag comprising a bag member of porous material and a sealed container within the bag member containing the ground coffee, and means associated with the container to rupture the latter while it is still confined within the bag member.

3. A coffee bag for making coffee infusion, said bag comprising an outer bag member of fabric and an inner sealed contained situated within and enclosed by the bag member and containing the ground coffee, said sealed container having provision for opening it while it is still enclosed within the outer bag, whereby the coffee bag has the usual appearance but the volatile ingredients of the coffee are retained by the sealed container until the latter is opened.

4. A coffee bag for making coffee infusion, said bag comprising an outer bag member of porous material and an inner hermetically sealed container situated within and enclosed by the bag member and containing the infusion producing material, said container having provision for opening it while it is located within the outer bag.

WILLIAM S. PATTERSON.